United States Patent [19]

Kirkwood et al.

[11] 4,120,440
[45] * Oct. 17, 1978

[54] WELDING, A STEEL SUITABLE FOR USE THEREIN

[75] Inventors: Philip R. Kirkwood, Middlesbrough; Allan Clark, Newton Aycliffe, both of England

[73] Assignee: British Steel Corporation, London, England

[*] Notice: The portion of the term of this patent subsequent to Jun. 14, 1994, has been disclaimed.

[21] Appl. No.: 795,884

[22] Filed: May 11, 1977

Related U.S. Application Data

[63] Continuation of Ser. No. 638,518, Dec. 8, 1975, abandoned.

[30] Foreign Application Priority Data

Dec. 12, 1974 [GB] United Kingdom ............... 53806/74

[51] Int. Cl.$^2$ ............................................. B23K 35/30
[52] U.S. Cl. .................................. 228/231; 75/123 B; 75/123 M; 219/146.1; 228/263; 428/677
[58] Field of Search ..................... 75/124, 125, 123 R, 75/123 B, 123 J, 123 M; 219/145, 146, 146.1; 148/127, 36; 428/677; 228/263, 231

[56] References Cited

U.S. PATENT DOCUMENTS

| 2,825,793 | 3/1958 | Kee ....................................... 219/146 |
| 3,115,406 | 12/1963 | Ballas et al. ............................. 75/124 |
| 3,745,294 | 7/1973 | Arikawa et al. ...................... 219/146 |
| 3,773,500 | 11/1973 | Kanazawa et al. ............... 75/123 M |
| 4,029,934 | 6/1977 | Clark et al. ........................... 219/145 |

*Primary Examiner*—Arthur J. Steiner
*Attorney, Agent, or Firm*—Bacon & Thomas

[57] ABSTRACT

A steel which contains up to 0.15% carbon, 0.5 to 1.5% manganese, 0.03 to 0.10% silicon, less than 0.2% molybdenum, up to 0.05 aluminum, 0.03 to 0.05% titanium and 0.002 to 0.008% boron is particularly suitable as a welding consumable, for example as an electrode for the submerged arc welding of high strength micro-alloyed structural steels. Especially when used with a basic flux, welds can be produced showing excellent notch toughness characteristics.

10 Claims, 3 Drawing Figures

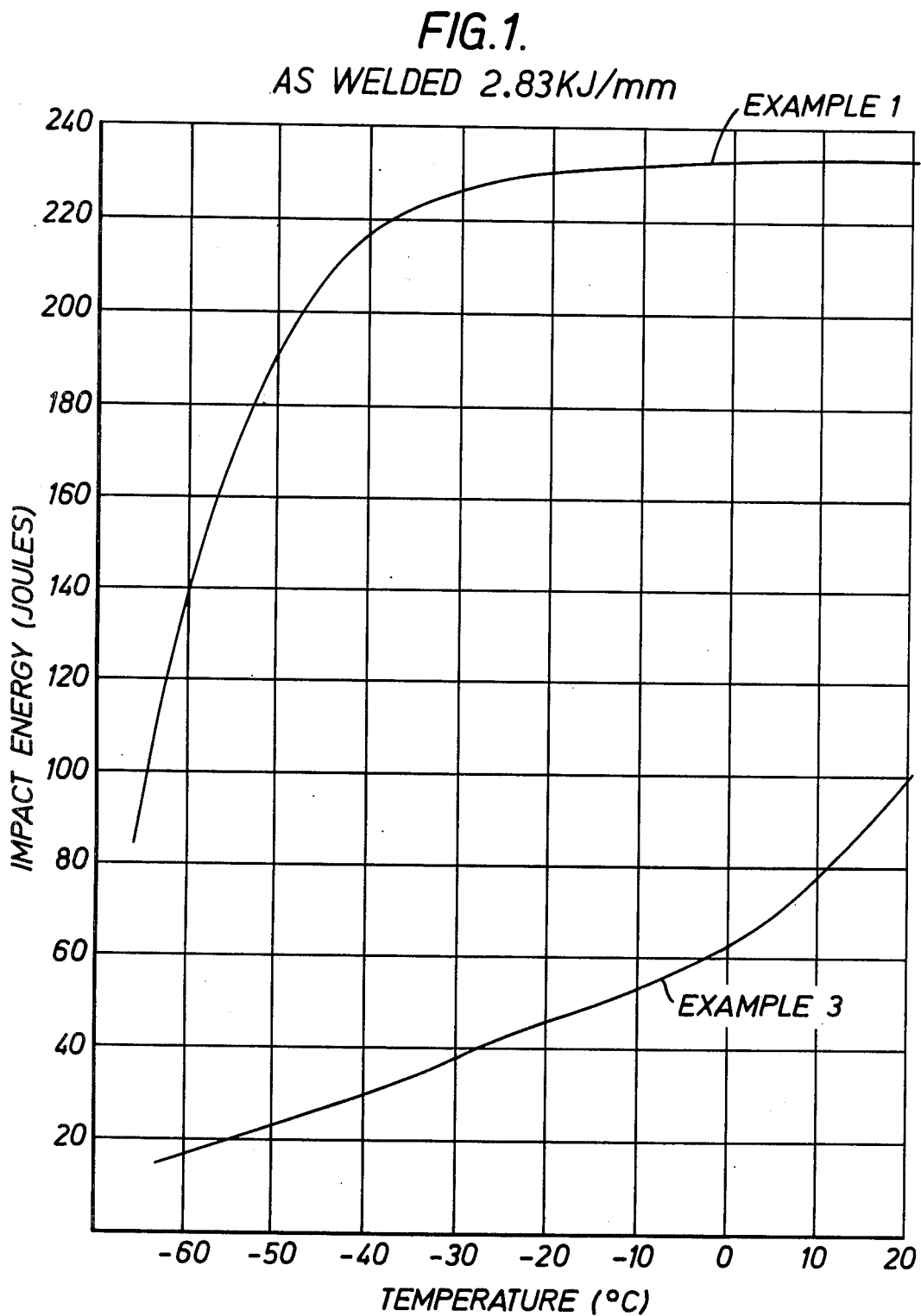

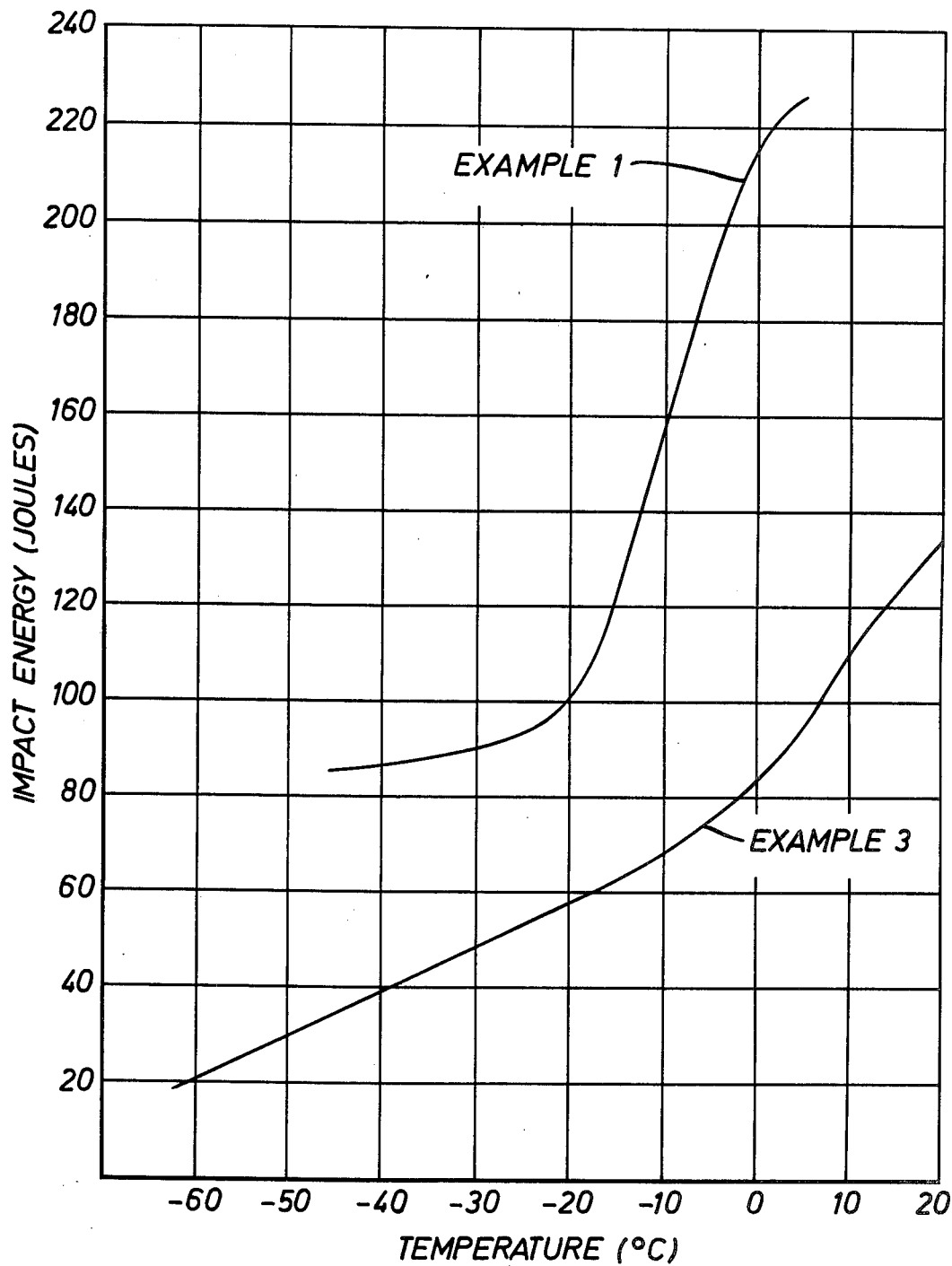

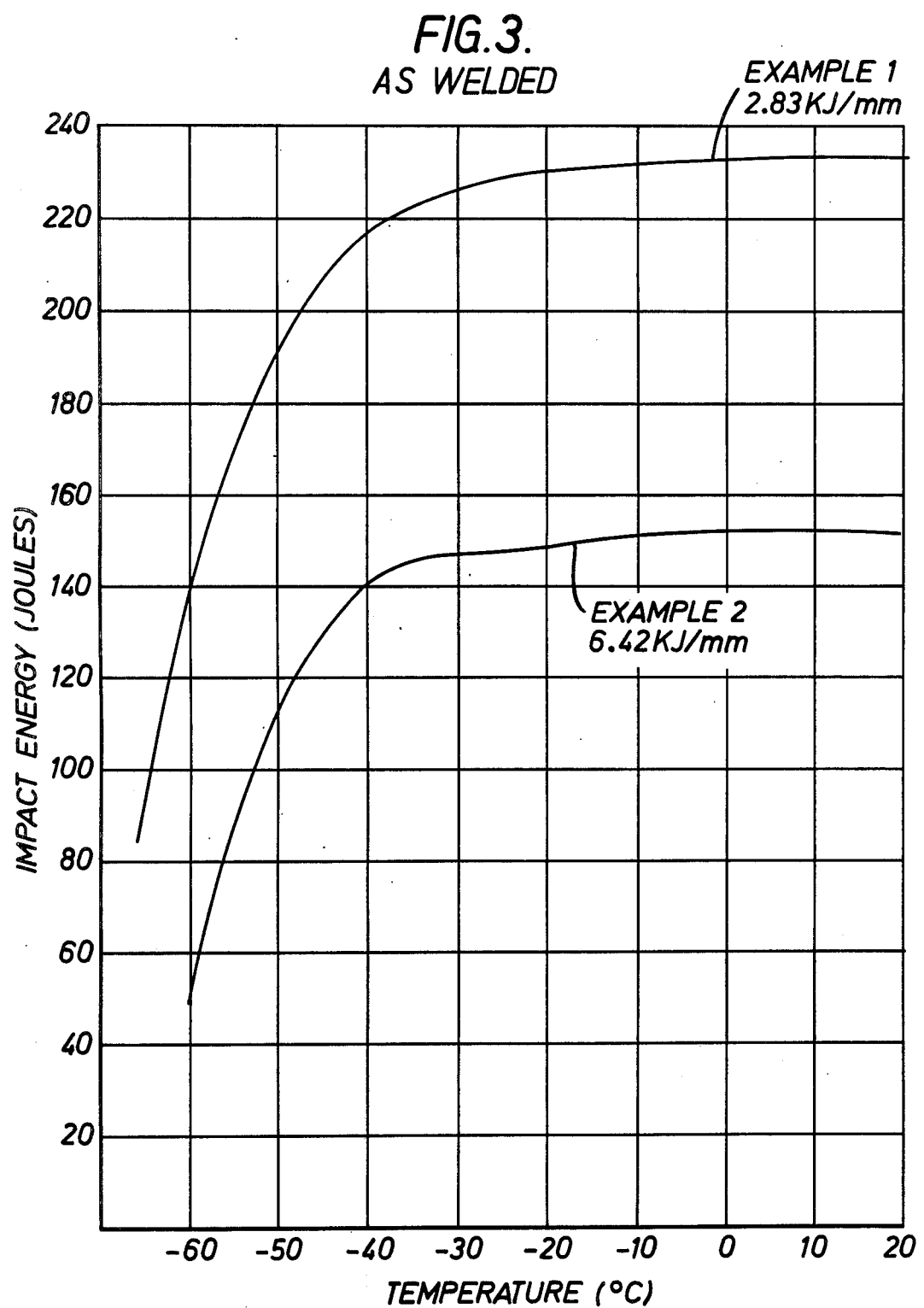

WELDING, A STEEL SUITABLE FOR USE THEREIN

This is a continuation, of application Ser. No. 638,518, filed Dec. 8, 1975, now abandoned.

This invention relates to welding, especially submerged are welding and similar welding techniques, and to steel which is suitable for use as a consumable in welding processes.

U.S. co-pending patent application Ser. No. 497,089 filed Aug. 13, 1974, now abandoned in favor of continuation application Ser. No. 720,358 filed Sept. 3, 1976 now U.S. Pat. No. 4,029,934, is directed to a steel suitable for use as a welding consumable having low carbon and silicon contents and containing titanium, boron and molybdenum as essential components. That steel has the following percentage composition:

Carbon — 0.15 maximum
Manganese — 0.5 - 1.5
Silicon — 0.03 - 0.10
Molybdenum — 0.2 - 0.6
Aluminum — 0.05 maximum
Titanium — 0.03 - 0.05
Boron — 0.002 - 0.008
Sulphur and Phosphorus: Each 0.04 maximum
Iron and incidental impurities: balance We have now found that a steel suitable for use as a welding consumable can be produced which does not require molybdenum to be present at 0.2% or above but which is otherwise similar in composition.

According to the present invention there is provided a steel of approximately the following percentage composition, although it is considered that the ranges given can in some cases be extended:

Carbon: 0.15 maximum, preferably 0.10 maximum
Manganese: 0.5–1.5
Silicon: 0.03–0.10
Molybdenum: Less than 0.2
Aluminium: 0.05 max
Titanium: 0.03–0.05
Boron: 0.002–0.008
Sulphur and Phosphorus: Each 0.04 max, preferably 0.03 max
Iron and incidental impurities: balance The quantity of manganese present is chosen according to the desired strength of the final weld metal.

The aluminium is only present in consequence of its use as a deoxidant in the steelmaking process. It will normally be present in an amount of at least 0.02% for this reason. However, aluminium contents below 0.025% and more especially 0.02% and below, have been found to give the better weld properties.

The titanium content is very important as it produces additional weld pool deoxidation, promotes the formation of smaller globular inclusions and protects the boron present from the action of oxygen and nitrogen.

Some boron must be present uncombined. It is preferred that the uncombined, or free, boron should be present in an amount of at least 0.0002%. The actual minimum amount of total boron required to be present in the steel will therefore depend on the amount which will be combined with oxygen and nitrogen, but it is considered that a minimum of 0.002% boron will usually result in sufficient free boron remaining in the steel. Low levels of oxygen and nitrogen in the steel are correspondingly desirable.

The type of steelmaking process chosen is not considered to be important. It is preferred to make the steel lacking aluminium, titanium and boron, and to add these elements subsequently in that order. The steel is killed, or deoxidised, principally with the aluminum, the titanium can remove a large part of any residual oxygen, and the boron is then finally added.

The invention additionally provides a welding consumable comprising a wire or rod formed of the steel of the invention, preferably provided with a thin coating of copper. The consumable in the form of wire or rod can be conveniently fed to the weld site. The copper coating improves electrical contact between the wire and the electrical power supply and also protects the wire against corrosion.

The wire will preferably be of a diameter between 1 mm and 8 mm. The amount of copper coating on the wire is suitably up to 0.15% by weight of the wire, the practical upper limit being that amount which results in the quantity of copper being transferred to the weld metal having a detrimental effect on its properties.

The invention further provides a method of welding, especially submerged arc welding or electroslag welding, wherein the consumable comprises the steel of the invention or a wire or rod formed of such steel. The welding method is otherwise conventional.

If the flux used is an acid flux there will be a tendency for the titanium and boron to oxidise and for silicon and manganese to transfer from the flux to the weld pool. A basic flux is therefore preferred to reduce oxidation and silicon and manganese transfer.

In the following examples, Examples 1 and 2 illustrate the invention, while Example 3 relates to the use of a standard carbon-manganese weld wire and is included for comparison purposes only.

In all the examples a pair of plates to BS 4360 50D were joined by submerged arc welding with a commercially available basic flux containing the following components in the percentages specified — $SiO_2$, 13.7; MnO, 0.1; $Fe_2O_3$, 1.29; $Al_2O_3$, 19.6; CaO, 12.58; MgO, 29.0; $TiO_2$, 0.5; $K_2O$, 0.76; $Na_2O$, 0.42; $CaF_2$, 18.0; $LiO_2$, 0.32; $Zr_2O_3$, 1.58. The plate thickness was 1.5 inches (38.1 mm).

The analyses of the test plate used for all welds, of the weld wires used and of the weld metal produced arc shown in Table 1.

All welds were made with a D.C. arc and the consumable electrode polarity was positive, although welds with a negative electrode are also possible.

TABLE 1

| | | C | Si | Mn | P | S | Mo | Total Al | B | Nb | Ti | Total N | Total O |
|---|---|---|---|---|---|---|---|---|---|---|---|---|---|
| Test Plate | All Examples | .155 | .35 | 1.16 | .017 | .02 | .02 | — | — | .03 | — | — | — |
| Weld Wire | Examples 1 & 2 | .062 | .06 | 1.03 | .005 | .006 | .012 | .031 | .003 | <.005 | .047 | .0027 | .0035 |
| | Example 3 | .113 | .27 | 1.06 | .011 | .033 | .025 | .005 | Nil | <.005 | <.005 | .0092 | .0117 |
| Weld Metal | Example 1 | .057 | .12 | .83 | .007 | .006 | .014 | .016 | .0005 | .006 | .012 | .005 | .049 |
| | Example 2 Side 1 | .08 | .19 | .92 | .010 | .006 | .015 | .015 | .0005 | .01 | .017 | .0056 | .035 |
| | Example 2 | | | | | | | | | | | | |

TABLE 1-continued

|  | C | Si | Mn | P | S | Mo | Total Al | B | Nb | Ti | Total N | Total O |
|---|---|---|---|---|---|---|---|---|---|---|---|---|
| Side 2 | .07 | .18 | .90 | .010 | .007 | .015 | .015 | .0008 | .008 | .013 | .005 | .035 |
| Example 3 | .076 | .23 | .90 | .017 | .016 | .014 | .015 | Nil | — | <.005 | .0095 | .031 |

EXAMPLE 1

A weld was made with a heat imput of 72 KJ/in. (2.8KJ/mm) The weld was tested for notch toughness (Charpy V-notch method) and tensile properties in the as-welded condition and in the stress-relieved condition.

EXAMPLE 2

A weld was made with a high heat input of 164 KJ/in (6.42 KJ/mm) a Two-sided fully commercial welding procedure was used and mechanical tests were carried out on samples extracted from both sides of the welded joint, in the as-welded condition.

EXAMPLE 3

A weld was made of comparison in an identical manner as in Example 1 with the same heat input of 72KJ/in (2.8 KJ/mm) using the conventional weld wire. Impact properties and tensile properties were measured in the as-welded and in the stress-relieved conditions.

The measured tensile properties of the welds are shown in Table 2.

TABLE 2

|  |  | 0.2% Proof Stress N/mm$^2$ | Ultimate Tensile Stress N/mm$^2$ | Elongation % | Reduction of Area % |
|---|---|---|---|---|---|
| Example 1 | As welded | 488 | 543 | 28 | 70 |
|  | Stress relieved | 383 | 463 | 31 | 76 |
| Example 2 | Side 1 (as welded) | 478 | 558 | 24 | 69 |
|  | Side 2 (as welded) | 443 | 541 | 26 | 69 |
| Example 3 | As welded | 445 | 488 | 28 | 72 |
|  | Stress relieved | 414 | 506 | 32 | 77 |

The impact properties of the welds, measured in Joules, are shown in Table 3,

TABLE 2

|  |  | −65° C | −60° C | −40° C | −20° C | 0° C | 15° C | 20° C |
|---|---|---|---|---|---|---|---|---|
| Example 1 | As welded | 88 | — | 219 | 230 | 234 | — | 229 |
|  | Stress relieved | — | — | 88 | 96 | 215 | — | — |
| Example 2 | Side 1 (as welded) | — | 42 | 90 | 129 | — | 158 | — |
|  | Side 2 (as welded) | — | 50 | 141 | 144 | — | 155 | — |
| Example 3 | As welded | — | 18 | 38 | 44 | 60 | — | 100 |
|  | Stress relieved | — | 20 | 41 | 60 | 80 | — | 135 |

The accompanying drawings are graphs comparing the impact performance of the welds in the as-welded and stress relieved conditions. FIG. 1 compares the welds of Examples 1 and 3 in the as-welded condition. FIG. 3 compares the welds of Examples 1 and 2 in the as-welded condition, illustrating the effect of the higher heat input in Example 2. It can be seen from the graphs that the impact properties at lower temperatures achieved with the wire according to the invention are much superior to those given by the standard carbon-manganese wire.

We claim:

1. A consumable welding wire for submerged arc welding under a basic flux, said wire consisting essentially of steel consisting essentially of
   Carbon 0.15 maximum
   Manganese: 0.5–1.5
   Silicon: 0.03–0.10
   Molybdenum: less than 0.2
   Aluminium: 0.05 maximum
   Titanium: 0.03–0.05
   Boron 0.002–0.008
   Sulphur: 0.04 maximum
   Phosphorus: 0.04 maximum
   Iron and incidental impurities: Balance.

2. A welding wire as claimed in claim 1 in which the carbon content of said steel is not more than 0.10%.

3. A welding wire as claimed in claim 1 in which the aluminium content of said steel is not more than 0.025%.

4. A welding wire as claimed in claim 1 in which the aluminium content of said steel is not more than 0.020%.

5. A welding wire as claimed in claim 1 in which the sulphur and phosphorus contents of said steel are each not more than 0.03%.

6. A welding wire as claimed in claim 1 in which uncombined boron of said steel is present in an amount of at least 0.0002%.

7. A welding wire as claimed in claim 1 provided with a thin coating of copper up to about 0.15% by weight of the wire.

8. In a method of welding steel the improvement comprising using as the welding consumable for producing a weldment a welding wire as claimed in claim 1.

9. In a method of submerged arc welding the improvement comprising melting a wire as claimed in claim 1 under a basic flux to provide the weldment.

10. A method of welding as claimed in claim 9 wherein the formed weld is subsequently stress relieved.

* * * * *